June 15, 1971  A. E. WOODCOCK  3,584,397
SHIP PILOTING TRAINER
Filed Sept. 27, 1968  3 Sheets-Sheet 1

Albert E. Woodcock
INVENTOR.

BY Harvey A. David
John M. Pease

Attorneys

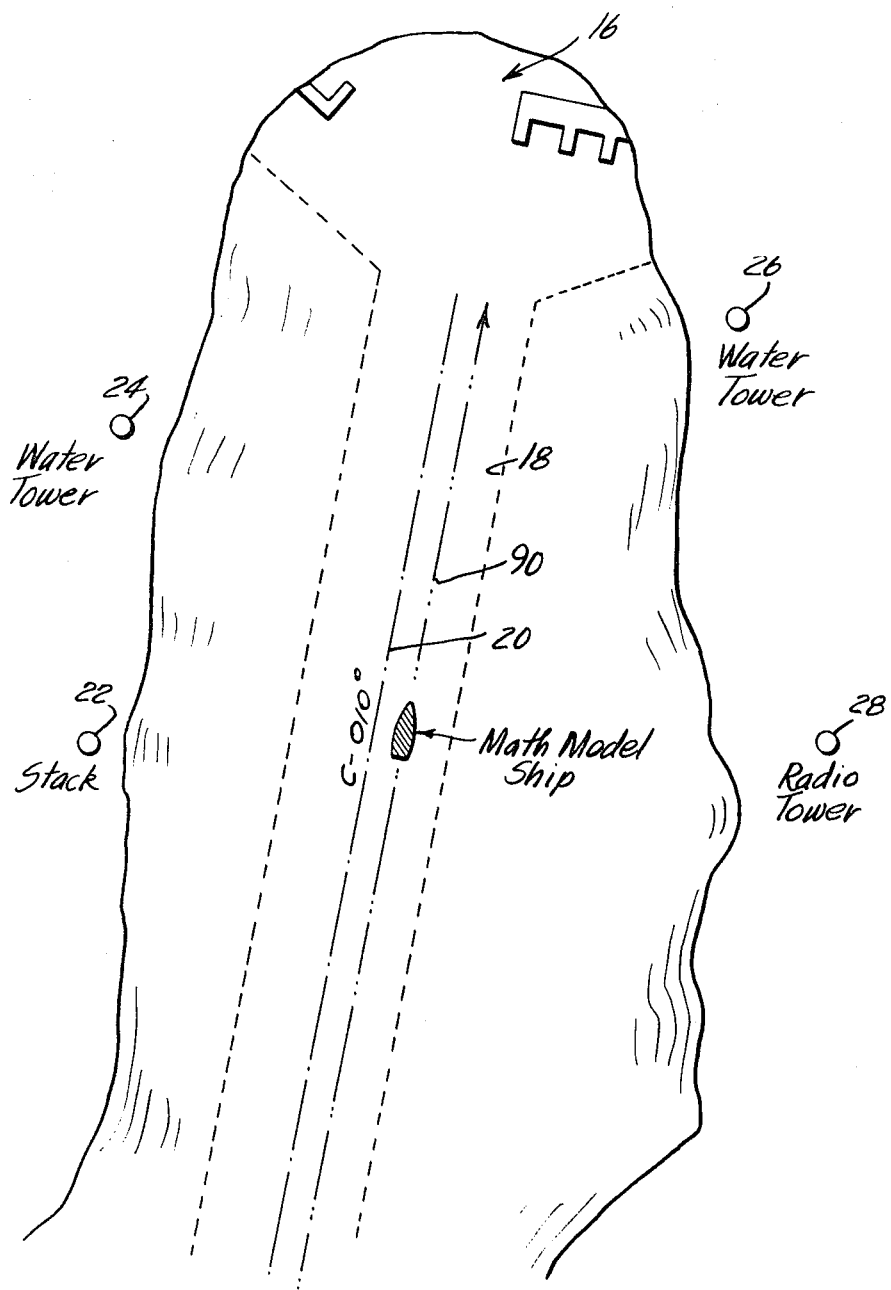

June 15, 1971     A. E. WOODCOCK     3,584,397
SHIP PILOTING TRAINER
Filed Sept. 27, 1968     3 Sheets-Sheet 3
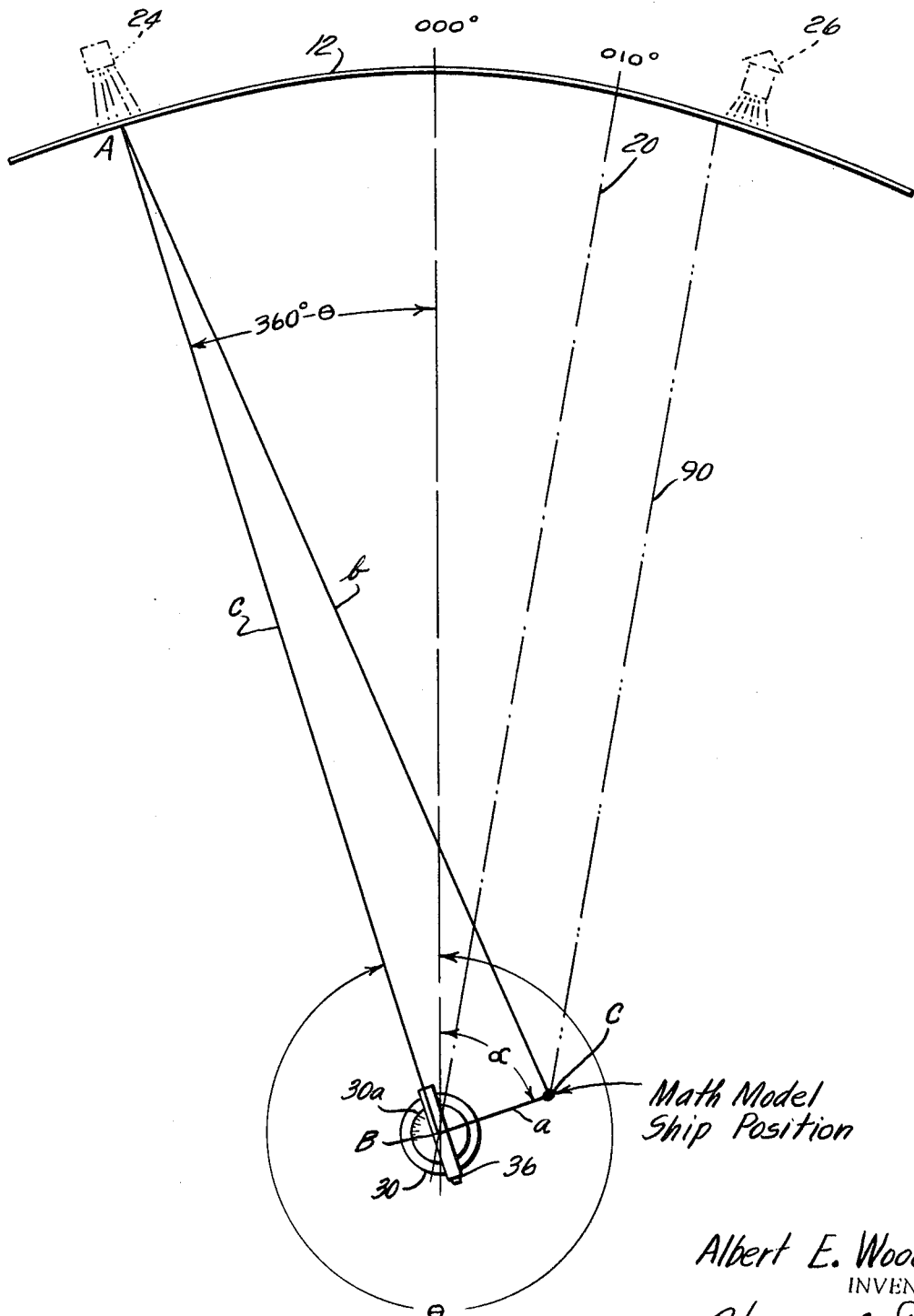
Albert E. Woodcock
INVENTOR.
BY Harvey A. David
John M. Pease
Attorneys United States Patent Office 3,584,397
Patented June 15, 1971

3,584,397
SHIP PILOTING TRAINER
Albert E. Woodcock, Winter Garden, Fla., assignor to the United States of America as represented by the Secretary of the Navy
Filed Sept. 27, 1968, Ser. No. 763,206
Int. Cl. G09b 9/06
U.S. Cl. 35—10.2     3 Claims

ABSTRACT OF THE DISCLOSURE

A ship piloting trainer is disclosed wherein a film de picting landmarks which would be seen upon entering a harbor is projected on a curved screen, a gyro repeater and alidade are disposed at the center of curvature o the screen, and computer means are provided for providing appropriate offsets to the gyro card whereby bearings and fixes will correspond to positions of a math mode ship.

---

The invention described herein may be manufactured and used by or for the Government of the United States of America for governmental purposes without the payment of any royalties thereon or therefor.

BACKGROUND OF THE INVENTION

This invention relates to the training of persons in the art of piloting ships and more particularly in the skill of obtaining fixes by taking bearings on charted landmarks such as water tanks, radio towers, buoys and the like. Such bearings are normally taken with the use of an alidade which is a sighting instrument fitted on a gyro compass repeater and which permits sighting of a landmark and viewing of the repeater compass card simultaneously whereby the true bearing of the landmark from the ship may be conveniently obtained. A line of position is plotted on the chart for each of a plurality of such bearings and, if taken in rapid succession, an intersection of two such lines of position, derived from landmarks on different bearings, may be regarded as a fix of the ship's position.

Training of shipboard navigators and underway watch officers in this technique has best been done in the past through actual shipboard training and experience. However, because of the great expenses involved in operating ships merely for training purposes, and the relatively small percentage of time which can ordinarily be allotted to the training of personnel when ships are actually operating in situations where piloting is being done, such as entering or leaving a port, it is desirable to provide means for effecting trainnig in piloting and other navigational techniques on land but under realistic circumstances.

BRIEF SUMMARY OF THE INVENTION

With the foregoing in mind, it is a principal object of this invention to provide an improved navigation or piloting trainer utilizing a motion picture made from a ship which progressed along a known track, the film being displayed upon a screen adjacent a gyro repeater stand having an alidade with which the trainee may take bearings of images of landmarks on the screen and, using these bearings, plot positions of a simulated or math model ship following his course and speed recommendations.

Another object of this invention is the provision of an improved piloting trainer of the foregoing character wherein the gyro repeater is caused to be offset by amounts necessary to cause bearings, when accurately taken by the trainee, to provide fixes corresponding to the positions of the math model ship rather than of the ship from which the motion picture was made.

BRIEF DESCRIPTION OF THE DRAWINGS

The invention may be further summarized as residing in certain combinations and arrangements of elements described more fully hereinafter with reference to the accompanying sheets of drawings forming a part of this specification, and in which:

FIG. 2 is a cartographic illustration of an exemplary harbor, the entry of which may be simulated by the trainer of FIG. 1; and FIG. 3 is a graphic illustration of certain operating principles of the trainer.

DESCRIPTION OF THE PREFERRED EMBODIMENT

Figure 1:
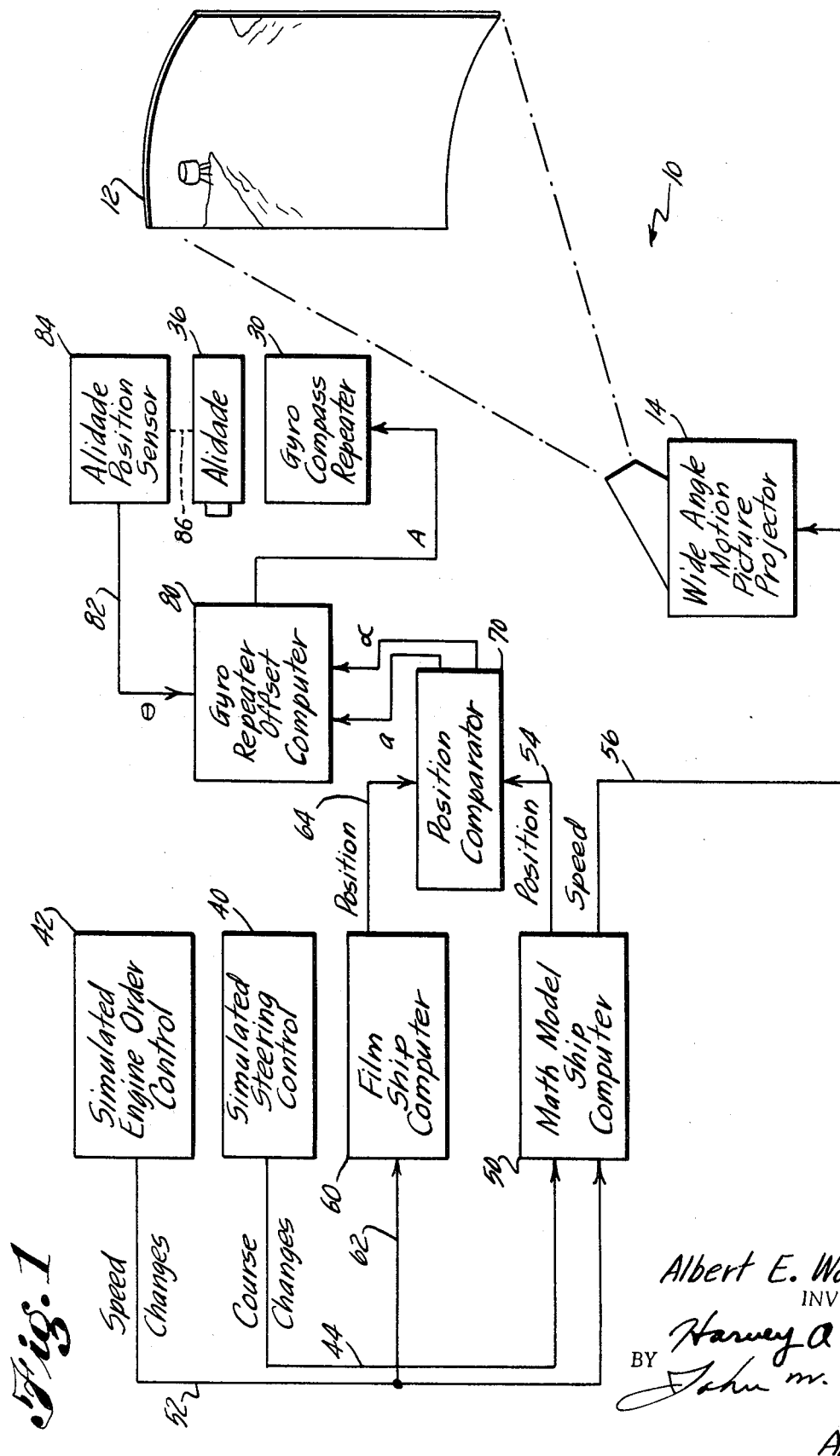
FIG. 1 is a schematic illustration, in block form, of a ship piloting trainer embodying the present invention.

In the embodiment of the invention illustrated in the drawings and described hereinafter, a navigation piloting trainer 10 is provided which is particularly useful in training personnel in the skill of ascertaining a ship's position by means of taking and plotting a plurality of bearings of landmarks. The trainer 10 comprises a cylindrically or spherically curved motion picture projection screen 12 on which is projected, by a wide angle motion picture film projector 14, a motion picture depicting the shores and landmarks which would be observed by the navigator of a ship as it progresses along a channel into a port or harbor such as that illustrated in FIG. 2. The film to be projected is produced by means of a wide angle camera mounted on an actual ship as it enters the harbor. Harbor 16 is approached by a channel 18 which is followed by the filming ship, the filming ship's track being indicated by the dot and dash line 20 along the center of the channel. Typical landmarks such as a smoke stack 22, water towers 24, 26, and a radio tower 28 are viewable in the film when projected on the screen 12.

Located at the center of curvature of the screen 12 is a gyro compass repeater 30 which may be either simulated or a piece of operational type of equipment from an operational gyro but in any event includes a compass card 30a (FIG. 3) which is rotatable about its axis to one side or the other of a position which would normally be oriented with true north, all in a manner and for purposes which will be made apparent as this specification proceeds. The simulated gyro repeater may be of any of the various types of simulated compasses well known in the simulator art wherein an offset angle can be introduced. Since the card is normally oriented with true north and need rotate to one side or the other by only a small angular amount to satisfy the training situation for which the invention is best suited, the card may simply be supported by a conventional galvanometer movement so as to be positioned in response to applied voltages. Of course, if this invention is to be incorporated in a larger navigation trainer wherein it is desirable to use selsyn type compass simulation, the teachings of U.S. Pat. No. 2,965,- 976 may be referred to for a description of the use of voltages to introduce offsets in a simulated compass presentation.

Mounted on the repeater 30 in the customary rotatable manner is an alidade 36 through which a trainee may sight landmarks projected on the screen 12. The alidade may be of any of the usual constructions permitting the viewer 3,584,397 to sight the desired landmark and, through the agency of a prism and other optical elements, to simultaneously observe the corresponding degree markings on the compass card.

The trainer 10 further comprises other elements common to the bridge of a ship and necessary to piloting such as a simulated steering control 40 and a simulated engine order control 42. The steering control 40 supplies course change signals, as is shown by flow line 44, to math model ship computer 50, while the engine order control 42 supplies speed change signals to the math model ship computer as is shown by flow line 52.

The math model ship computer 50 may be of any conventional design, either analog or digital, which serves to combine the course change and speed change inputs in accordance with mathematical formulas representing characteristics such as turning circle, acceleration, deceleration, and the like, of the type or class of ship being simulated. One example of such a computer is the dual computer found in U.S. Pat. 2,855,701. The result is to provide, as one output of the computer 50, signals representative of the math model ship's position. Thus, the output on line 54 is representative of the ship's position as it changes throughout a training session.

In addition, the computer 50 provides, as a second output, signals on line 56 representative of the math model ship's speed as it may change throughout the problem. The math model ship speed signals on line 56 are utilized to control the rate of operation of the projector 14 so that the landmarks and shoreline will come into view and appear to be passed at a speed corresponding to the speed selected for the math model ship at the control 42.

A second ship computer, which may be referred to as the film ship computer 60, is provided which is also responsive to the speed change signals from the control 42, as shown by lines 52 and 62. The film ship computer 60, however, is calculated always to be on the track 20 of the ship from which the film was made for projection by the projector 14 on the screen 12. The output of the film ship computer 60 on line 64 is representative of the position of that ship along the track 20 as the problem progresses and is such as to substantially equal the forward progress of the math model ship along the channel 18. The film ship computer 60 may also be a computer of the type disclosed in Pat. No. 2,855,701.

The math model ship position signals on line 54 and the film ship position signals on line 64 are applied to a position comparator 70. The comparator 70 provides as its outputs, represented by lines 72 and 74 respectively, signals corresponding to the distance $a$ (see FIG. 3) of the math model ship from the film ship, and the true bearing of the math model ship from the film ship. These outputs of the comparator 70 are applied as inputs to a gyro repeater offset computer 80. The comparator 70 may conveniently comprise the apparatus described in U.S. Pat. No. 2,603,883.

The computer 80 receives, as another input represented by line 82, signals corresponding to the angular or azimuthal position $\theta$ of the alidade 36. The signals representing angle $\theta$ are derived by an alidade position sensor 84 which may conveniently comprise potentiometer means mechanically coupled to the alidade 36 as indicated at 86. Of course other non-mechanical position sensing may be employed utilizing magnetic or other means avoiding a direct mechanical coupling.

Inasmuch as the alidade 36 is located at the center of curvature of the screen 12, if the gyro repeater card 36a were always oriented to indicate true north relevant to the film presentation, all fixes plotted from bearings taken of the projected landmarks would fall on the track 20.

The trainee controlled math model ship's position, however, will usually be off of the track 20 at the distance $a$ and bearing $\alpha$, such a math model position being shown at C in FIG. 3. In order to have fixes plotted from bearings taken of the filmed landmarks accurately indicate the course 90 of the math model ship, it is necessary to offset the compass card 30a from the true north position an appropriate angular amount and an appropriate direction for each bearing taken. In the situation example illustrated in FIG. 3, the offset of the card 30a would have to be equal to the angle A in order for a line of position plotted from the bearing taken of the tower 24 to pass through the point C. This offset is computed by simple trigonometry for each situation by the offset computer 80.

Because the alidade 36 and its supporting repeater 30 are located at the center of curvature B of the screen 12, the distance $c$ between the image of any of the landmarks on the screen and the alidade is a known constant. This value $c$ completes the information necessary to solve for the angle A of the triangle formed by the alidade at B and the math model ship position at C. That is to say we now have two sides ($a$ and $c$) and their included angle (B), since $B=\alpha+(360°-\theta)$ for the example illustrated in FIG. 3. It will be apparent to one skilled in the art to which this invention pertains that the trigonometric solution may be similarly arrived at for any position of the math model ship with respect to the film ship position and for any of the landmarks of which bearings may be taken. A suitable computer capable of performing the desired trigonometric problems, namely rendering cosine law solutions, is the Reeves REAC 550 analog computer manufactured by Reeves Instrument Company.

Because the computations required by the computers 50, 60, 80, and comparator 70 are straightforward and well known, the functions of all of these elements may be performed within different portions of a properly programmed general purpose computer. Accordingly, the invention lends itself to ready incorporation in larger training systems such as a general navigational trainer which is designed to provide training in all or most of the known navigational skills such as use of loran, celestial navigation, and the like.

From the foregoing detailed description of one embodiment of the invention, it will be recognized that the previously mentioned objects and advantages, as well as others apparent therein, are readily achieved by the described piloting trainer. Of course it will be also recognized that the described embodiment is given by way of example and that the invention may be carried out with equivalent elements.

What is claimed is:
1. A ship piloting trainer comprising:
    a curved projection screen;
    a motion picture projector operative to project a film depicting landmarks which would be seen from a ship entering a harbor substantially along a predetermined course;
    a simulated gyro repeater disposed at the center of curvature of said screen having a rotatable compass card;
    an alidade associated with said gyro repeater for taking bearings of landmark images projected on said screen;
    simulated steering control means for providing steering signals as an output;
    simulated speed control means for providing speed change signals as an output;
    math model ship computer means responsive to the output of said steering control means and to the output of said speed control means to provide an output corresponding to the position of a math model ship;
    film ship computer means responsive to said speed control means to provide an output corresponding to the position of a film ship;
    comparator means responsive to said outputs of said math model ship computer and said film ship computer to provide the position of said math model ship relative to said film ship as outputs in terms of bearing and distance;
    alidade position sensing means providing an output corresponding to the angular position of said alidade;

gyro offset computer means responsive to said outputs of said comparator means and of said alidade position sensing means to provide as an output signals corresponding to the offset angles necessary for said gyro repeater to provide bearings which will appear to have been taken from the math model ship position; and said gyro repeater being responsive to the output of said offset computer so as to position said card to said offset angles.

2. A ship piloting trainer as defined in claim 1, and wherein:

said math model ship computer being operative to provide as a second output a signal representative of the speed of the math model ship; and said projector being responsive to changes in said second output to correspondingly change the projection speed.

3. A ship piloting trainer as defined in claim 2, and wherein:

said gyro offset computer derives said offset angles trigonometrically from said outputs of said comparator means and of said alidade position sensing means.

References Cited

UNITED STATES PATENTS

| | | | |
|---|---|---|---|
| 2,554,394 | 5/1951 | Wood | 35—10.2 |
| 2,591,752 | 4/1952 | Wicklund | 35—10.2X |
| 2,855,701 | 10/1958 | Roos | 35—10.2 |
| 3,151,310 | 9/1964 | Shepherd et al. | 35—10.2X |
| 3,208,336 | 9/1965 | Vago | 35—10.2X |

FOREIGN PATENTS

| | | | |
|---|---|---|---|
| 892,996 | 3/1960 | Great Britain | 35—12 |

MALCOLM A. MORRISON, Primary Examiner

F. D. GRUBER, Assistant Examiner

U.S. Cl. X.R.

35—11; 235—150.2